United States Patent
Kos et al.

(10) Patent No.: US 6,971,231 B2
(45) Date of Patent: Dec. 6, 2005

(54) PISTON AND ROD ASSEMBLY AND METHOD

(75) Inventors: Piotr A. Kos, Miamisburg, OH (US); Mike W. Hurtt, Waynesville, OH (US)

(73) Assignee: Delphi Technologies, Inc., Troy, MI (US)

(*) Notice: Subject to any disclaimer, the term of this patent is extended or adjusted under 35 U.S.C. 154(b) by 18 days.

(21) Appl. No.: 10/736,096

(22) Filed: Dec. 15, 2003

(65) Prior Publication Data

US 2005/0126164 A1    Jun. 16, 2005

(51) Int. Cl.[7] ............................. F16F 9/53; F16D 31/02
(52) U.S. Cl. ..................................... 60/326; 188/267.2
(58) Field of Search ........................... 60/326; 92/248, 92/255; 188/267, 267.1, 267.2

(56) References Cited

U.S. PATENT DOCUMENTS

| | | | |
|---|---|---|---|
| 6,260,675 B1 * | 7/2001 | Muhlenkamp | 188/267 |
| 6,311,810 B1 * | 11/2001 | Hopkins et al. | 188/267.2 |
| 6,386,343 B1 * | 5/2002 | Robinson et al. | 188/267 |
| 6,419,058 B1 * | 7/2002 | Oliver et al. | 188/267.2 |
| 6,612,409 B2 * | 9/2003 | Lun et al. | 188/267.2 |

* cited by examiner

Primary Examiner—Edward K. Look
Assistant Examiner—Michael Leslie
(74) Attorney, Agent, or Firm—Michael D. Smith

(57) ABSTRACT

A piston assembly for a magneto-rheological fluid damper is provided that exhibits good sealing properties at elevated temperatures. The piston assembly comprises a piston rod having an axial bore therethrough, a piston core coupled to a distal end of the piston rod for movement thererwith, an electrical terminal located on the piston core, a conductor, a sealing member and a support member. The conductor is coupled to the terminal to form an electrical connection and passes through the bore in the piston rod. The sealing member is adjacent to the distal end of the piston rod for preventing the penetration of fluid into the bore. The support member is located and sized to block an opening into the bore to prevent the sealing member from being forced through the opening when the piston assembly is subjected to pressure. In another aspect, the support member is slide-able over the conductor from a proximal position in which the end of the conductor is exposed to a distal position in which the electrical connection at the end of the conductor is covered.

20 Claims, 4 Drawing Sheets

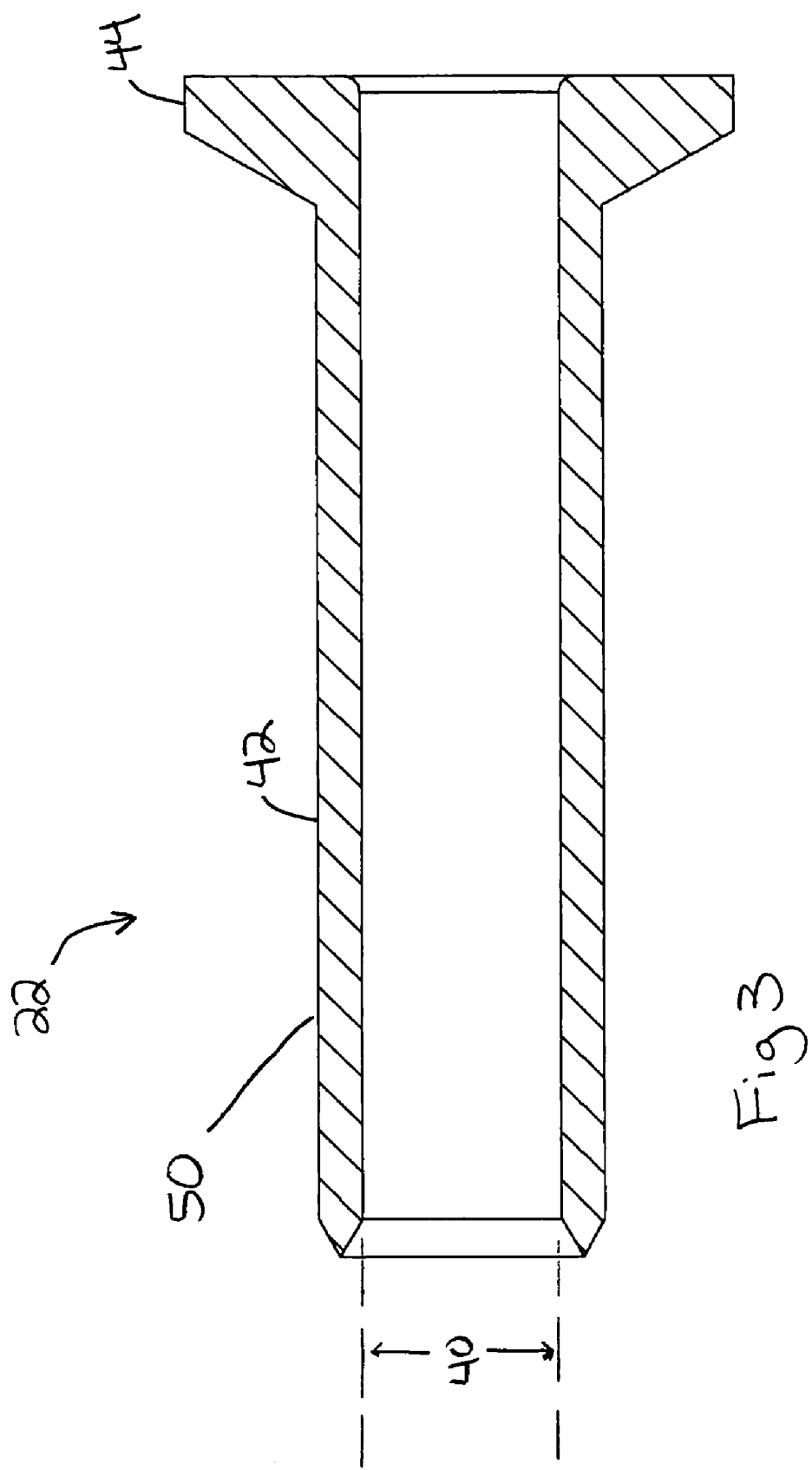

PISTON AND ROD ASSEMBLY AND METHOD

TECHNICAL FIELD

The present invention relates generally to magneto-rheological fluid dampers, and more specifically to a piston assembly for a magneto-rheological damper that exhibits good sealing properties at elevated temperatures.

BACKGROUND

Magneto-rheological ("MR") fluid dampers are known in the automotive industry. Some examples of prior art linearly-acting MR fluid dampers are described in U.S. Pat. Nos. 6,260,675, 6,390,252, 6,497,308 and 6,547,044, which are incorporated herein by reference.

Current MR fluid damper designs, like the one shown in FIG. 2 of U.S. Pat. No. 6,260,675, do not possess desired high temperature capabilities. Specifically, the sealing member of the damper's piston assembly may fail under the high temperature and pressure conditions experienced in MR fluid dampers. If the sealing member fails, MR fluid in the piston chamber may leak into contact with electrically sensitive areas causing shorts to ground that disrupt the proper operation of damper. One possible failure mode may occur when the sealing member softens under high temperature and is pushed or extruded by pressurized MR fluid through an opening in the piston rod to expose sensitive electrical connections that would otherwise be shielded within the piston rod.

Accordingly, a new piston assembly design for a MR fluid damper is desired.

SUMMARY

In a first aspect, a piston assembly for use with a magneto-rheological fluid damper is provided. The piston assembly comprises a piston rod having an axial bore therethrough, a piston core coupled to a distal end of the piston rod for movement therewith, an electrical terminal located on the piston core, a conductor coupled to the terminal to form an electrical connection, a sealing member adjacent to the distal end of the piston rod for preventing the penetration of fluid into the bore, and a support member located between the sealing member and an opening to into the bore. The support member is sized to block the opening into the bore to prevent the sealing member from being forced through the opening when the piston assembly is subjected to pressure.

In a second aspect, a piston assembly for a magneto-rheological fluid damper is provided that comprises a piston rod having an axial bore therein, a piston core coupled to a distal end of the piston rod, an electrical terminal on the piston core, a conductor coupled to the terminal to form an electrical connection and a support member that is slideable over the conductor from a proximal position to a distal position during assembly of the piston. When the support member is in the proximal position, the distal end of the conductor is exposed so that the electrical connection between the conductor and the terminal can be made. When the support member is in the distal position, the support member may cover or surround the electrical connection to electrically insulate it. The support member is sized to be engaged by the piston rod to slide the support member from the proximal position to the distal position as the piston rod is slid over the conductor into engagement with the piston core. In one embodiment the support member and the support member are the same structure.

In a third aspect, a method of making a piston assembly for a magneto-rheological fluid damper is provided. The method comprises the steps of providing a piston rod having an axial bore therethrough, providing a piston core having an electrical terminal, providing a conductor that is sized to slideably fit within the bore in the piston rod, providing a support member that is slideable over a distal end of the conductor from a proximal position to a distal position, forming an electrical connection between the terminal and the conductor when the support member is in the proximal position, sliding the piston rod over the conductor such that the conductor passes through the axial bore in the piston rod and such that the piston rod operatively engages the support member to slide the support member from the proximal position to the distal position, and coupling piston core to the piston rod for movement therewith. When the support member is in the distal position it will cover and electrically insulate the electrical connection.

In a fourth aspect, a support member for a piston assembly of a magneto-rheological fluid damper is provided. The support member comprises a sleeve that has an inner diameter, a small outer diameter portion and a large outer diameter portion. The inner diameter of the sleeve is sized to closely fit the outer diameter of an associated conductor over which the sleeve slides. The large outer diameter portion of the sleeve is sized so as not to permit the sleeve to pass completely through the bore of an associated piston rod into which the sleeve may partially fit. The sleeve may be sized to block passage through the bore of the associated piston rod. The sleeve may also be made from an electrically insulating material such as nylon 6/6.

BRIEF DESCRIPTION OF THE DRAWINGS

FIG. 3 is a cross-sectional view of an insulating sleeve according to a second aspect.

DETAILED DESCRIPTION

Figure 1:
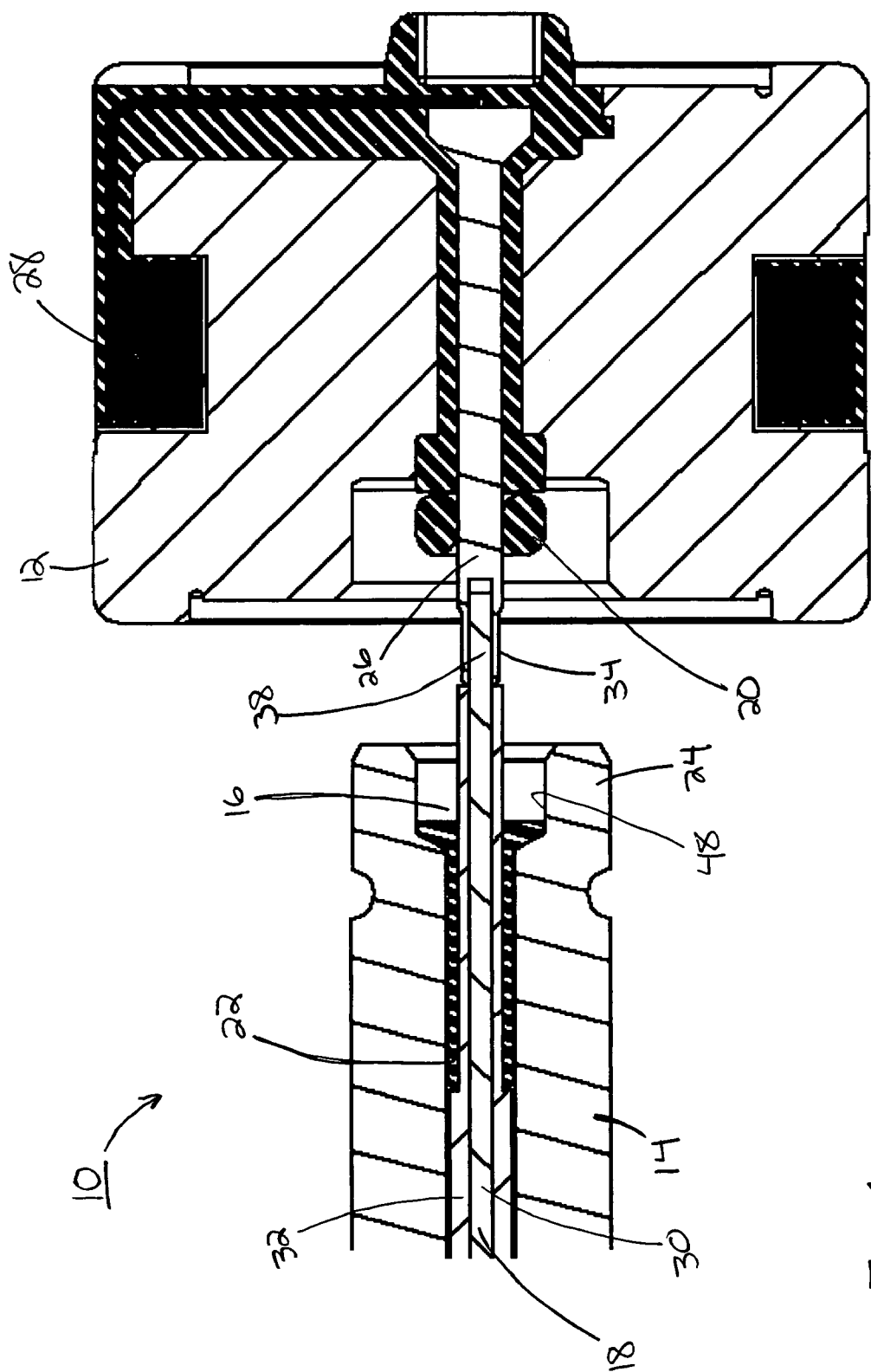
FIG. 1 is a cross-sectional view of a piston assembly according to one aspect in a first stage of assembly.
Figure 2:
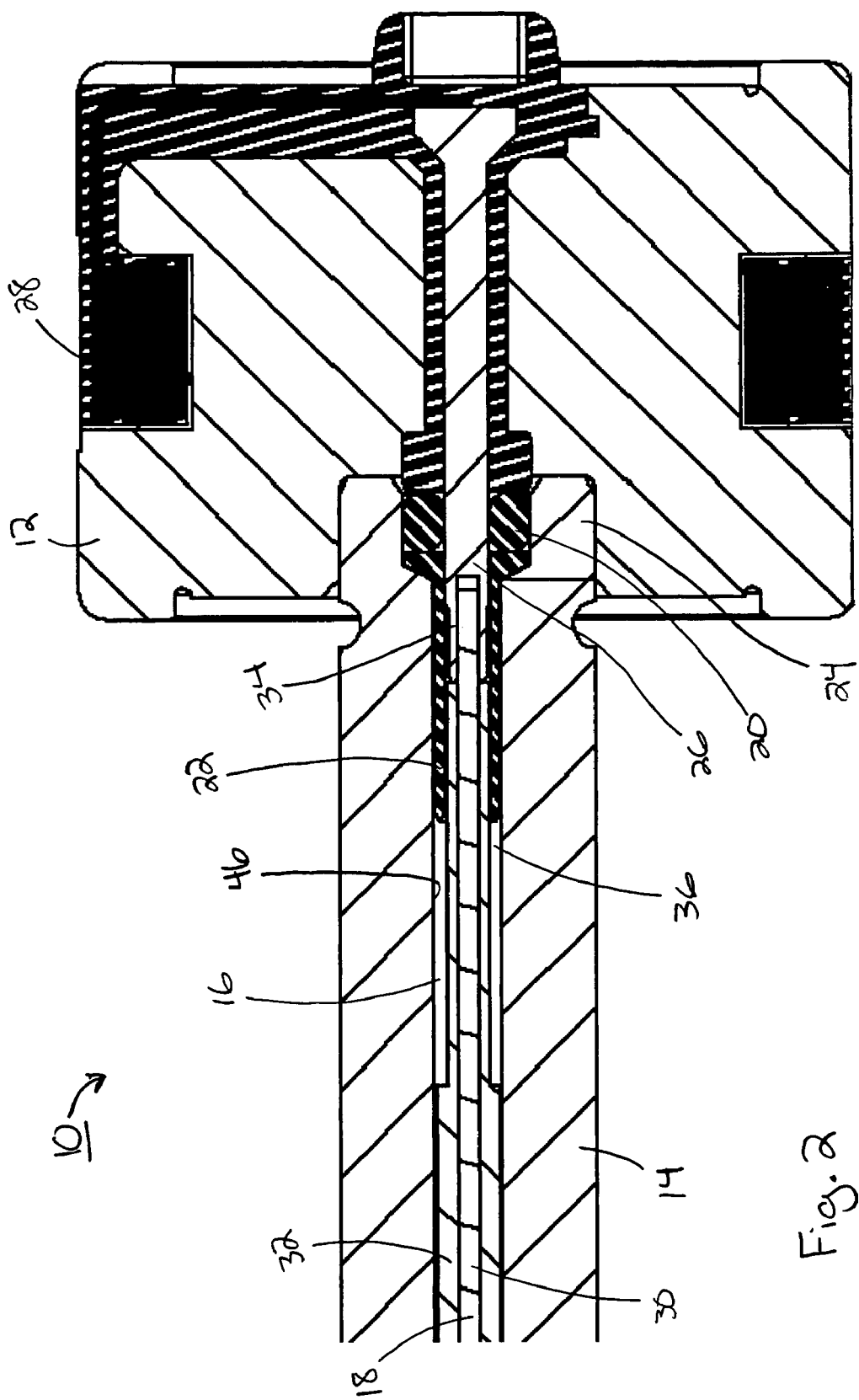
FIG. 2 is a cross-sectional view of the piston assembly of FIG. 1 in a second stage of assembly.

FIGS. 1 and 2 are cross-sectional views of a piston assembly 10 for a MR fluid damper in various stages of assembly. The piston assembly 10 comprises a piston core 12, a piston rod 14 having an axial bore 16 therethrough, a conductor 18 and a support member 22. According to one aspect, the piston assembly 10 may further include a sealing member 20. The novel support member 22 of the piston assembly 10 provides for robust and consistent assembly, as well as, improved high temperature capabilities.

The piston core 12 may be formed from a magnetic material and is coupled to a distal end 24 of the piston rod 14 for movement therewith. The piston core 12 includes a terminal 26 that is in electrical contact with a coil 28 around the perimeter of the piston core 12. During operation of the MR fluid damper electrical current through the coil 28 can be varied to control damping as is well known. The terminal 26 may protrude from, or be located on, a proximal side of the piston core 12 and may be sized to be received within the bore 16 of the piston rod 14. The piston core 12 may be coupled to the piston rod 14 by, for example, a press fit operation.

The conductor 18, which may include both a conductive element 30 and an outer layer of electrical insulation 32 is coupled to the terminal 26 to form an electrical connection 34. Preferably, the electrical connection 34 is formed by a crimping operation but other methods of electrically coupling the conductor 18 to the terminal 26 may be used. The conductor 18 passes through the bore 16 in the piston rod 14 so as to operatively connect the coil 28 to an external power source, which is not shown. In the embodiment shown in FIGS. 1 and 2, the piston rod 14 provides an electrical path to ground. Accordingly, the conductor 18 must remain electrically insulated from the piston rod 18 as it passes through the bore 16.

In the embodiment shown in FIGS. 1 and 2, a means for sealing the bore is provided to prevent MR fluid from penetrating into the bore 16 and contacting sensitive electrical areas, such as the electrical connection 34 between the conductor 18 and terminal 26. Because the MR fluid contains metallic particles, contact between the MR fluid and any portion of the positive terminal, including the electrical connection 34, may result in shorts to ground that disrupt the proper function of the damper. Referring specifically to FIGS. 1 and 2, the means for sealing the bore comprises a sealing member 20 located adjacent to the distal end 24 of the piston rod 14. Specifically, the sealing member 20 is an o-ring that is slipped over the terminal 26 of the piston core 12 and in the bore 16 of the piston rod 14. Of course, other suitable sealing members that are known in the art can be used.

According to one aspect, the support member 22 may be sized and located to block an opening 36 into the bore 16 of the piston rod 14 to prevent the sealing member 20 from being forced through the opening 36 when the piston assembly 10 is subjected to high temperature and pressure. As previously described, prior art piston assembly designs were found to not possess the desired high temperature capabilities. Specifically, under high temperature and pressure the sealing member 20 could be pushed or extruded through the bore 16 of the piston rod 14 to expose the electrical connection 34 between the conductor 18 and the terminal 26. With the addition of the support member 22, the present design has effectively blocked the opening 36 into the bore 16, also referred to as the "extrusion gap." To prevent the support member 22 itself from deforming and extruding through the bore 16 of the piston rod 14, the support member 22 may be made from a material that resists deformation even at high temperature. One example of a suitable material is a nylon 6/6 with at least 15 percent glass content. Preferably, a nylon 6/6 with 33 percent glass content is used.

According to another aspect, the support member 22 may be concentric with the conductor 18 and slideable over the conductor 18 from a proximal position, shown in FIG. 1, to a distal position, shown in FIG. 2. When the support member 22 is in the proximal position, a distal end 38 of the conductor 18 is exposed so that the electrical connection 34 between the conductor 18 and the terminal 26 can be made. When the support member 22 is in the distal position, the support member 22 covers, to electrically insulate, the electrical connection 34. The support member 22 may further be sized to be engaged by the piston rod 14 during assembly to slide the support member 22 from the proximal position to the distal position as the piston rod 14 is slid over the conductor 18 into engagement with the piston core 12. According to this aspect, the support member should be formed from an electrically insulating material. One preferred material is a nylon 6/6 having 33 percent glass content.

Figure 4A:
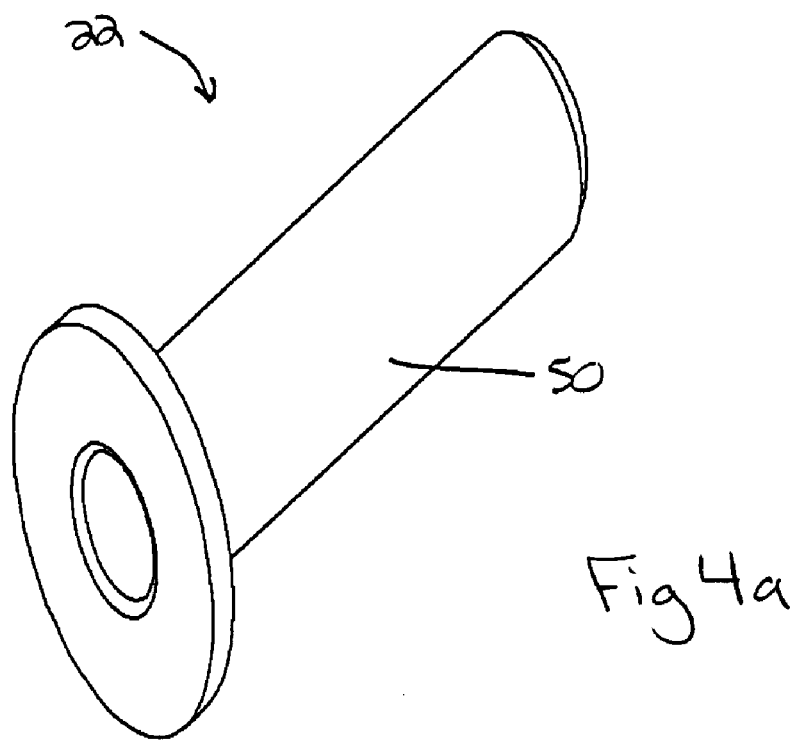
FIGS. 4a and 4b are isometric views of the insulating sleeve of FIG. 3.
Figure 4B:
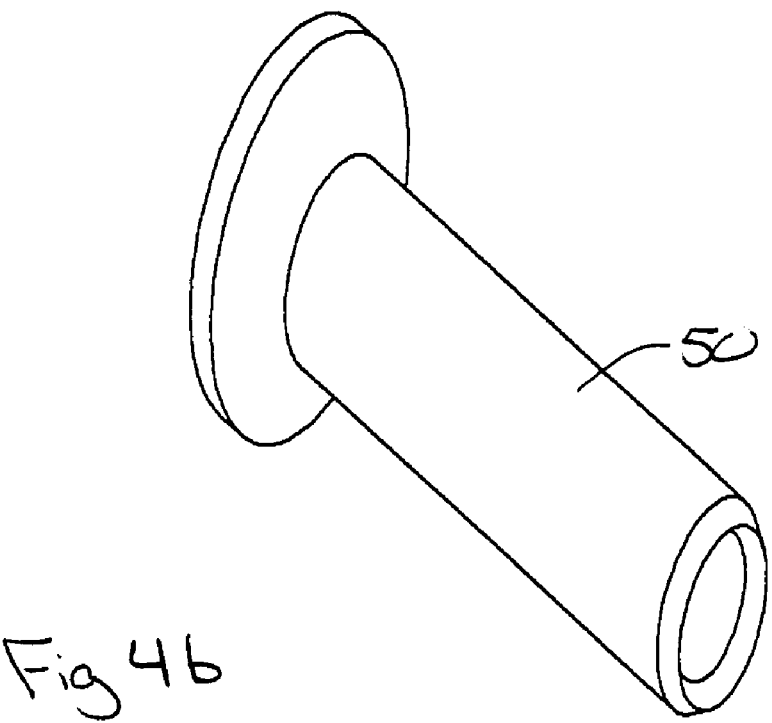

Referring to FIGS. 3 and 4a–b, the support member 22 may comprise a sleeve 50 having an inner diameter 40, a small outer diameter portion 42 and a large outer diameter portion 44. The large outer diameter portion 44 may be located distally of the small outer diameter portion 42. The inner diameter 40 of the support member 22 may be sized to closely fit an outer diameter of the conductor 18 while permitting the sleeve to slide over the conductor. The inner diameter 40 of the support member 22 may also be sized to closely fit an outer diameter of the terminal 26. The large outer diameter portion 44 of the support member 22 may be sized so as not to permit the sleeve to pass completely through the bore 16 of the piston rod 14. Thus, an opening 36 into the bore 16 of the piston rod 14, defined by the inner surface of the bore 16 and the outer surface of either the conductor 18 or the terminal 26, is effectively blocked by the support member 22.

Referring now to FIGS. 1 and 2, the bore 16 of the piston rod 14 may comprise a small inner diameter portion 46 and a large inner diameter portion 48 located distally of the small inner diameter portion 46. The small outer diameter portion 42 of the support member 22 may be sized to fit within the small inner diameter portion 46 of the piston rod 14. The large outer diameter portion 44 of the support member 22 may be sized to fit within the large inner diameter portion 48 of the piston rod 14 but not within the small inner diameter portion 46. Thus, as the piston rod 14 is slid over the conductor 18 in the direction shown by arrow A in FIG. 1, the piston rod 14 will engage the support member 22 to slide the support member from the proximal position to the distal position.

As best depicted in FIG. 2, the support member 22 herein described both blocks the extrusion gap 36 and covers the electrical connection 34 between the conductor 18 and the terminal 26. Accordingly, the support member 22 may function both as a means for supporting the sealing member 20 and as a means for electrically insulating the electrical connection 34. Furthermore, because the support member 22 can be retracted to the proximal position, the electrical connection 34 can be formed without having to, for example, crimp through insulation. This provides for a more robust and consistent electrical coupling operation.

In another aspect, a method of assembling a piston assembly for a magneto-rheological fluid damper is provided. The method includes the preparatory steps of providing a piston rod having an axial bore therethrough, providing a piston core having an electrical terminal, providing a conductor that is sized to slideably fit within the bore in the piston rod, and providing a support member that is slideable over a distal end of the conductor from a proximal position to a distal position. When the support member is in the proximal position a distal end of the conductor is exposed. The method further includes the steps of forming an electrical connection between the terminal and the conductor when the support member is in the proximal position, sliding the piston rod over the conductor such that the conductor passes through the axial bore in the piston rod and such that the piston rod operatively engages the support member to slide the support member from the proximal position to the distal position, and coupling piston core to the piston rod for movement therewith. When the support member is in the distal position it covers, to electrically insulate, the electrical connection.

What is claimed is:

1. A piston assembly for a magneto-rheological fluid damper, the piston assembly comprising:
a piston rod having an axial bore therethrough;

a piston core coupled to a distal end of the piston rod for movement therewith;

an electrical terminal located on the piston core;

a conductor coupled to the terminal to form an electrical connection, the conductor passing through the bore in the piston rod;

a sealing member in the bore of the piston rod for preventing the penetration of fluid into the bore; and a support member located between the sealing member and an opening into the bore, the support member sized to block the opening into the bore to prevent the sealing member from being forced through the opening when the piston assembly is subjected to pressure.

2. A piston assembly as claimed in claim 1, wherein the support member is concentric with the conductor and slideable over the conductor from a proximal position to a distal position during assembly of the piston;

wherein when the support member is in the proximal position, the distal end of the conductor is exposed so that the electrical connection between the conductor and the terminal can be made; and wherein when the support member is in the distal position, the support member covers the electrical connection.

3. A piston assembly as claimed in claim 2, wherein the support member comprises a cylindrical sleeve having a raised feature near a distal end of the sleeve and wherein the piston rod engages the raised feature during assembly to slide the support member from the proximal position to the distal position as the piston rod is coupled to the piston core.

4. A piston assembly as claimed in claim 2, wherein the support member comprises a cylindrical sleeve having an inner diameter, a small outer diameter portion and a large outer diameter portion located distally of the small outer diameter portion, wherein the bore of the piston rod comprises a small inner diameter portion and a large inner diameter portion located distally of the small inner diameter portion, wherein the inner diameter of the support member is greater than or equal to an outer diameter of the distal end of the conductor, wherein the small outer diameter portion of the support member is sized to fit within the small inner diameter portion of the bore, and wherein the large outer diameter portion of the support member is sized to fit within the large inner diameter portion of the bore but not within the small inner diameter portion of the bore.

5. A piston assembly as claimed in claim 4, wherein the piston rod engages the support member during assembly to slide the support member from the proximal position to the distal position as the piston rod slides over the conductor and is coupled to the piston core.

6. A piston assembly as claimed in claim 4, wherein the outer surface of the sleeve is tapered from the large outer diameter portion of the sleeve to the small outer diameter portion of the sleeve and the inner surface of the bore is correspondingly tapered at a similar angle from the large inner diameter portion of the bore to the small inner diameter portion of the bore.

7. A piston assembly as claimed in claim 2, wherein the support member comprises a sleeve made from an electrically insulating material.

8. A piston assembly as claimed in claim 7, wherein the electrically insulating material comprises nylon 6/6.

9. A piston assembly as claimed in claim 7, wherein the electrically insulating material comprises a nylon 6/6 having at least 15 percent glass content.

10. A piston assembly for a magneto-rheological fluid damper, the piston assembly comprising:

a piston rod having an axial bore therethrough;

a piston core coupled to a distal end of the piston rod for movement therewith, an electrical terminal located on the piston core;

a conductor coupled to the terminal to form an electrical connection, the conductor passing through the bore in the piston rod;

a means for sealing the bore to prevent fluid from penetrating into the bore; and a means for supporting the sealing means to prevent the sealing means from being forced into the bore of the piston rod beyond the electrical connection when the piston assembly is subjected to pressure.

11. The piston assembly of claim 10, further comprising a means for electrically insulating the electrical connection between the terminal and the conductor.

12. The piston assembly of claim 11, wherein the support means and the insulating means are the same structure.

13. A piston assembly for a magneto-rheological fluid damper, the piston assembly comprising:

a piston rod having an axial bore therethrough;

a piston core coupled to a distal end of the piston rod for movement therewith;

an electrical terminal located on the piston core;

a conductor coupled to the terminal to form an electrical connection, the conductor passing through the bore in the piston rod; and a support member that is concentric with the conductor and slideable over the conductor from a proximal position to a distal position during assembly of the piston;

wherein when the support member is in the proximal position, a distal end of the conductor is exposed so that the electrical connection between the conductor and the terminal can be made;

wherein when the support member is in the distal position, the support member covers, to electrically insulate, the electrical connection; and wherein the support member is sized to be engaged by the piston rod to slide the support member from the proximal position to the distal position as the piston rod is slid over the conductor into engagement with the piston core.

14. A method of assembling a piston assembly for a magneto-rheological fluid damper, the method comprising the steps of:

providing a piston rod having an axial bore therethrough;

providing a piston core having an electrical terminal;

providing a conductor that is sized to slideably fit within the bore in the piston rod;

providing a support member that is slideable over a distal end of the conductor from a proximal position to a distal position, wherein the distal end of the conductor is exposed when the support member is in the proximal position;

forming an electrical connection between the terminal and the conductor when the support member is in the proximal position;

sliding the piston rod over the conductor such that the conductor passes through the axial bore in the piston rod and such that the piston rod operatively engages the support member to slide the support member from the proximal position to the distal position, wherein the support member insulates the electrical connection when in the distal position; and coupling piston core to the piston rod for movement therewith.

15. A support member for a piston assembly of a magnetorheological fluid damper having a piston rod with an axial bore therethrough, a piston core with an electrical terminal, and a conductor passing through the bore in the piston rod and coupled to the terminal to form an electrical connection, the support member comprising:

a sleeve having an inner diameter, a small outer diameter portion and a large outer diameter portion, wherein the inner diameter of the sleeve is sized to closely fit an outer diameter of the associated conductor while permitting the sleeve to slide over the conductor and wherein the large outer diameter portion of the sleeve is sized so as not to permit the sleeve to pass completely through the bore of the associated piston rod.

16. The support member of claim 15, wherein the outer surface of the sleeve is tapered from the large outer diameter portion to the small outer diameter portion.

17. The support member of claim 15, wherein the sleeve is sized to block passage through the bore of the associated piston rod.

18. The support member of claim 15, wherein the sleeve comprises an electrically insulating material.

19. The support member of claim 18, wherein the electrically insulating material comprises nylon 6/6.

20. The support member of claim 18, wherein the electrically insulating material comprises a nylon 6/6 having at least 15 percent glass content.

* * * * *